(12) United States Patent
Krishnamoorthy

(10) Patent No.: US 10,153,995 B2
(45) Date of Patent: Dec. 11, 2018

(54) METHOD AND APPARATUS FOR EFFECTING WEB PAGE ACCESS IN A PLURALITY OF MEDIA APPLICATIONS

(71) Applicant: [24]7.AI, INC., San Jose, CA (US)

(72) Inventor: Prabhakaran Krishnamoorthy, Tamilnadu (IN)

(73) Assignee: [24]7.AI, INC., San Jose, CA (US)

( * ) Notice: Subject to any disclaimer, the term of this patent is extended or adjusted under 35 U.S.C. 154(b) by 141 days.

(21) Appl. No.: 14/902,462

(22) PCT Filed: Jul. 1, 2014

(86) PCT No.: PCT/US2014/045100
§ 371 (c)(1),
(2) Date: Dec. 31, 2015

(87) PCT Pub. No.: WO2015/002979
PCT Pub. Date: Jan. 8, 2015

(65) Prior Publication Data
US 2016/0352659 A1    Dec. 1, 2016

Related U.S. Application Data

(60) Provisional application No. 61/841,838, filed on Jul. 1, 2013.

(51) Int. Cl.
*G06F 15/16*    (2006.01)
*H04L 12/58*    (2006.01)
*G06F 17/30*    (2006.01)
*H04L 29/08*    (2006.01)

(52) U.S. Cl.
CPC ...... *H04L 51/046* (2013.01); *G06F 17/30899* (2013.01); *H04L 51/08* (2013.01); *H04L 67/02* (2013.01)

(58) Field of Classification Search
CPC ......... H04L 12/58; H04L 29/08; H04L 51/08; H04L 67/02; H04L 51/046; G06F 17/30899
See application file for complete search history.

(56) References Cited

U.S. PATENT DOCUMENTS

| | | | |
|---|---|---|---|
| 6,101,510 A | 8/2000 | Stone et al. | |
| 8,090,779 B2 * | 1/2012 | Ludwig | H04L 51/04 709/206 |
| 8,185,591 B1 * | 5/2012 | Lewis | G06Q 10/107 358/1.15 |

(Continued)

FOREIGN PATENT DOCUMENTS

CN    102685018 A    9/2012

*Primary Examiner* — Benjamin M Thieu
(74) *Attorney, Agent, or Firm* — Perkins Coie, LLP

(57) ABSTRACT

One or more media applications are configured to facilitate Web page access. Such media applications receive a request from a user for access to a Web page. The Web page is retrieved from, for example, one or more Web servers, a file, and so on, and the content of the Web page is displayed within the media application. Display of the Web page content within the media application obviates the need to change applications to view the Web page content. By remaining within the application, a more natural and intuitive technique for inter-user communication is provided.

33 Claims, 7 Drawing Sheets

(56) References Cited

U.S. PATENT DOCUMENTS

| | | | |
|---|---|---|---|
| 8,365,081 B1* | 1/2013 | Amacker | G06Q 10/10 705/27.1 |
| 8,930,473 B2* | 1/2015 | Thazhmon | G06Q 10/10 709/204 |
| 8,935,617 B2* | 1/2015 | Mayblum | H04L 51/22 345/111 |
| 9,313,282 B2* | 4/2016 | Bank | H04L 67/22 |
| 9,736,213 B2* | 8/2017 | Mendez | G06F 17/30873 |
| 2006/0224951 A1 | 10/2006 | Burke et al. | |
| 2008/0059592 A1 | 3/2008 | Marsh et al. | |
| 2010/0057854 A1 | 3/2010 | Chinnam et al. | |
| 2010/0064018 A1* | 3/2010 | Luo | G06F 17/30905 709/206 |
| 2010/0070899 A1 | 3/2010 | Hunt et al. | |
| 2011/0142344 A1 | 6/2011 | Fukushima | |
| 2012/0047449 A1 | 2/2012 | Burckart et al. | |
| 2012/0284639 A1* | 11/2012 | Yuniardi | G06Q 10/00 715/752 |
| 2013/0042169 A1 | 2/2013 | Reedy | |
| 2013/0055113 A1* | 2/2013 | Chazin | H04L 12/1822 715/758 |
| 2013/0219276 A1* | 8/2013 | Shan | H04L 51/046 715/722 |
| 2014/0019884 A1* | 1/2014 | Dinan | H04L 12/1813 715/758 |
| 2014/0280603 A1* | 9/2014 | Rideout | H04W 4/21 709/205 |
| 2014/0317207 A1* | 10/2014 | Ji | H04L 51/046 709/206 |
| 2014/0365914 A1* | 12/2014 | Peng | H04L 51/046 715/752 |
| 2014/0372403 A1* | 12/2014 | Liu | G06F 17/30864 707/706 |
| 2015/0154156 A1* | 6/2015 | Meyers, Jr. | G06F 17/2235 715/205 |

* cited by examiner

METHOD AND APPARATUS FOR EFFECTING WEB PAGE ACCESS IN A PLURALITY OF MEDIA APPLICATIONS

CROSS REFERENCE TO RELATED APPLICATIONS

This application is a 35 U.S.C. § 371 application of International Application No. PCT/US2014/045100, filed Jul. 1, 2014, which claims priority to U.S. provisional patent application No. 61/841,838, filed Jul. 1, 2013, the entirety of which is incorporated herein by this reference thereto.

FIELD

The invention relates to Web browsing. More particularly, the invention relates to facilitating Web page access in a plurality of media applications.

BACKGROUND

Media applications, i.e. applications facilitating access to, or exchange of, a variety of media content are increasingly deployed in electronic devices, such as personal computers, laptops, smartphones, and the like. Media applications include, for example, chat applications, electronic mail applications ("email"), Web browsers, and the like. Such media applications facilitate access to, or exchange of, media content such as, for example, textual content, graphical content, audio-visual content, or any combination thereof. For example, the chat applications support exchange of short instant textual messages, pictures, videos, etc. between two or more chat application participants.

However, such applications are limited in their ability to support Web page access. For example, one or more Web links exchanged between two chat application participants, upon being accessed, i.e. clicked, may open in a Web browser application which is distinct from the chat application. The quality of communication may be affected in such cases due to the need for each participant to switch back and forth between two applications, i.e. the Web browser application and the chat application. Moreover, a flow of communication may also be interrupted due to a lack of sequential, logical communication between the participants.

Thus, while various applications can support and share text messages, pictures, and video clips, for example, these applications are generally not well suited for supporting access to Web pages. For example, selecting a shared Web page link causes a change from the application with which the user was interacting to a Web browser. The application swap can cause a distinct change in the quality and mode of communication because the user must swap between and among the various applications used, thus interrupting the flow of communication.

Even media applications, such as Web browsers, which are configured to facilitate Web page access, are limited in their ability to access multiple Web pages at the same time. For example, in typical Web-browsers a user can open Web pages in one or more windows or in one or more tabs, but cannot access multiple pages simultaneously in a single window or a single tab.

SUMMARY

Embodiments of the invention facilitate Web page access across a plurality of media applications. Users employ a wide range of media applications on a variety of electronic devices to access the many types of media content that are available on the Internet. The users choose the application or applications that best suits the types of communications they want to conduct with one or more other users. The electronic devices include, for example, smartphones, handheld devices, tablet computers, laptop computers, and so on. The media applications include, for example, chat, email, Web browsers, etc. and the applications can support content including voice, text, graphics, audio, video, and so on.

DETAILED DESCRIPTION

In embodiments of the invention, a user communicates with one or more other users via a variety of devices. The users can share media content with various media applications including, for example, voice and text chat, email, Web browsers, etc. The media content includes, for example; text, graphics, audio, video, multimedia, and so on. Embodiments of the invention facilitate Web page access in a plurality of media applications by combining Web browsing with such media applications. Users communicate with each other through a variety of channels including, for example, wired networks, wireless networks, cellular networks, and so on.

Definitions

The term "media applications" as used herein refers to applications that facilitate access to, or exchange of, a variety of media content. Some examples of media applications include chat applications, email applications, Web browsers, and the like. Such media applications facilitate access to, or exchange of, media content such as textual content, graphical content, audio-visual content, or any combination thereof.

The term "Web page access" as used herein refers to access to media content, which is stored in the form of Web pages on one or more Web servers corresponding to World Wide Web ("Web").

DISCUSSION

In embodiments of the invention, one or more media applications are configured to facilitate Web page access.

Such media applications receive a request from a user for access to a Web page. The Web page is retrieved from, for example, one or more Web servers, a file, and so on, and the content of the Web page is displayed within the media application. Display of the Web page content within the media application obviates the need to change applications to view the Web page content. By remaining within the application; a more natural and intuitive technique for inter-user communication is provided.

Embodiments of the invention facilitate Web page access in a plurality of media applications. In some embodiments of the invention, Web browsing is combined with media applications, such as chat applications, email applications, and the like. For example, in some embodiments of the invention, a user enters chat messages or graphical elements, or browses Web pages in the same window as that in which the user participates in a chat session. In some embodiments of the invention, a standalone browser is provided that is capable of providing access to Web pages in a scroll-based manner, i.e. as Web pages are accessed they open below previously accessed Web pages, to provide contextual and configurable access to content.

Figure 1:
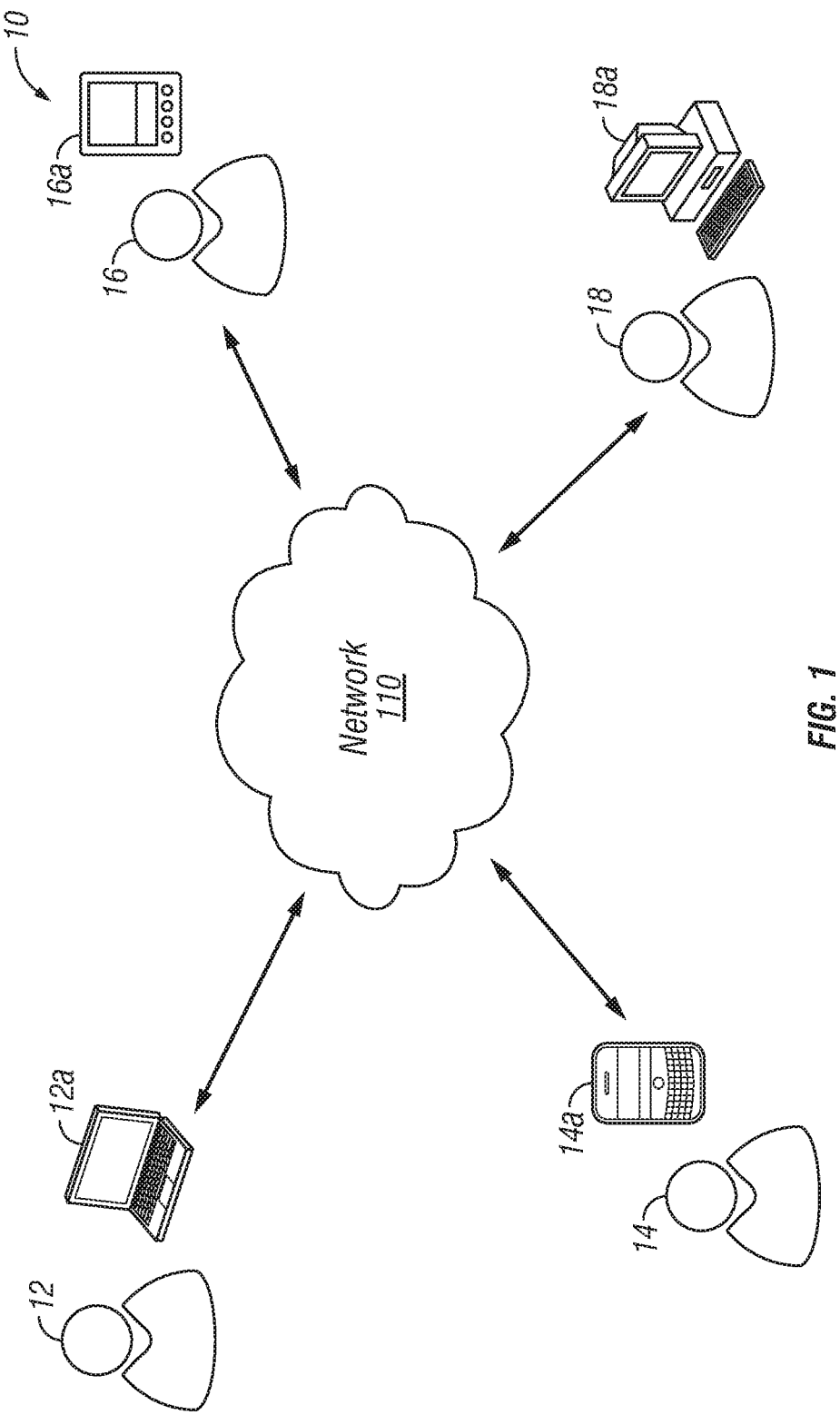
FIG. 1 is a block schematic diagram showing an environment in which the invention may be practiced.

FIG. 1 is a block schematic diagram showing an environment in which the invention may be practiced. The environment 10 includes a plurality of users, such as users 12, 14, 16, and 18. The users in FIG. 1 are in communication with each other via a network 11. The users are depicted for purposes of example and the environment may include more or fewer users. Each user is associated with an electronic device that facilitates network-based communication. For example, the user 12 is associated with a laptop 12a, the user 14 is associated with a smartphone 14a, the user 16 is associated with a tablet personal computer (PC) 16a, and the user 18 is associated with a desktop PC 18a.

The electronic devices, such as the laptop, smartphone, tablet PC, and desktop PC are hereinafter collectively referred to as "user devices" and singularly as a "user device." The user devices are depicted herein for purposes of example. The user devices may be any electronic device that allows user access over a network. Examples of a network include wired networks, wireless networks, and a combination thereof. Examples of wired networks include Ethernet, local area networks (LAN), fiber-optic cable networks, and the like. Examples of wireless networks include cellular networks, such as GSM/3G/CDMA networks, wireless LAN, Bluetooth or Zigbee networks, and the like. An example of a combination of wired and wireless networks includes the Internet. The user devices access Web content that is stored as Web pages that are available over the network from one or more Web servers (not shown).

The user devices may include one or more media applications that facilitate communication between the users. For example, the user devices include media applications, such as those that facilitate chat, email, Web browsing, and the like. The users communicate with each other via the media applications present in their respective user devices. In embodiments of the invention, a Web browser is embedded within the media applications to support Web page access. An exemplary media application comprising a chat application that facilitates Web page access is explained below with reference to FIG. 2.

Figure 2:
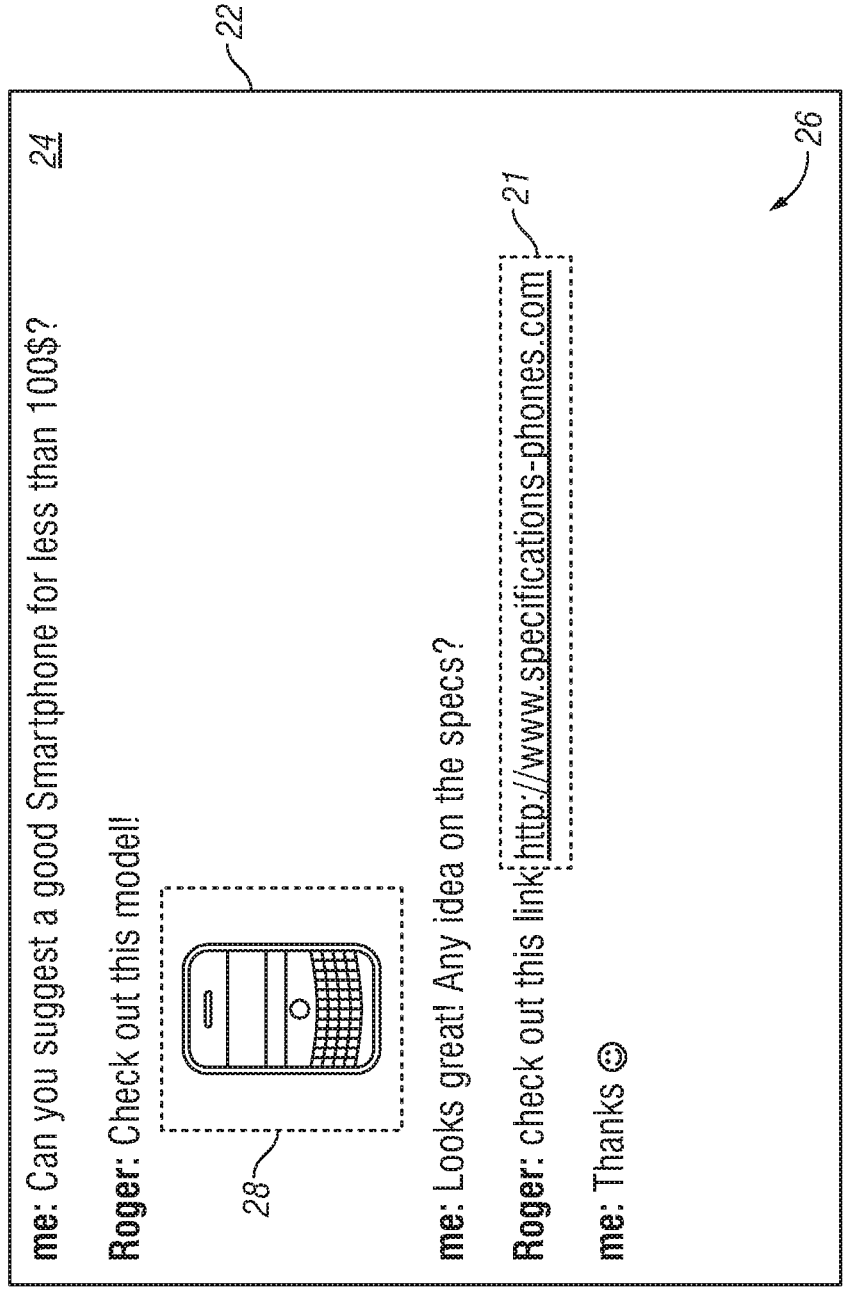
FIG. 2 is a screenshot showing a portion of a chat application interface according to the invention.

FIG. 2 is a screenshot showing a portion of a chat application interface 22 according to the invention. In FIG. 2, only a portion of a screenshot is displayed, i.e. the messaging window 24 of the chat application interface. The chat application interface may include other components that are not shown in FIG. 2, such as an input bar for typing or posting media content to be exchanged; one or more menu options, such as options for indicating a type of content entered. e.g. text, graphics, browsing content, and the like; and menu options for customizing view settings, such as font, color, and the like. The chat application interface shown in FIG. 2 is a part of a messaging application, i.e. a media application, that facilitates the exchange of messages between two or more chat participants. The messaging application may be included in any of the user devices and may correspond to any of the users depicted in FIG. 1. In embodiments of the invention, the messaging application is downloaded from external sources, such as public or private application stores, and installed in the user's device. In embodiments of the invention, the messaging application is a Web application that is accessed from a Web server upon user request The messaging window depicts a snapshot of an ongoing online conversation 26 between a user, referred to for the purposes of this discussion as "John," and another, remote user "Roger." In FIG. 2, the chat application interface is included in a user device that is associated with John and hence "John" is addressed as "me" in the conversation. As can be seen from the conversation, John is asking for suggestions from Roger concerning the purchase of a smartphone for less than $100 US. In response, Roger posts a thumbnail image 28 of a smartphone that he recommends. In response to a request by John for specifications that correspond to the smartphone shown in the thumbnail image, Roger provides John with a hyperlink 21, for example, http://www.specifications-phones.com. John then thanks Roger for providing him with the requested information.

Figure 3:
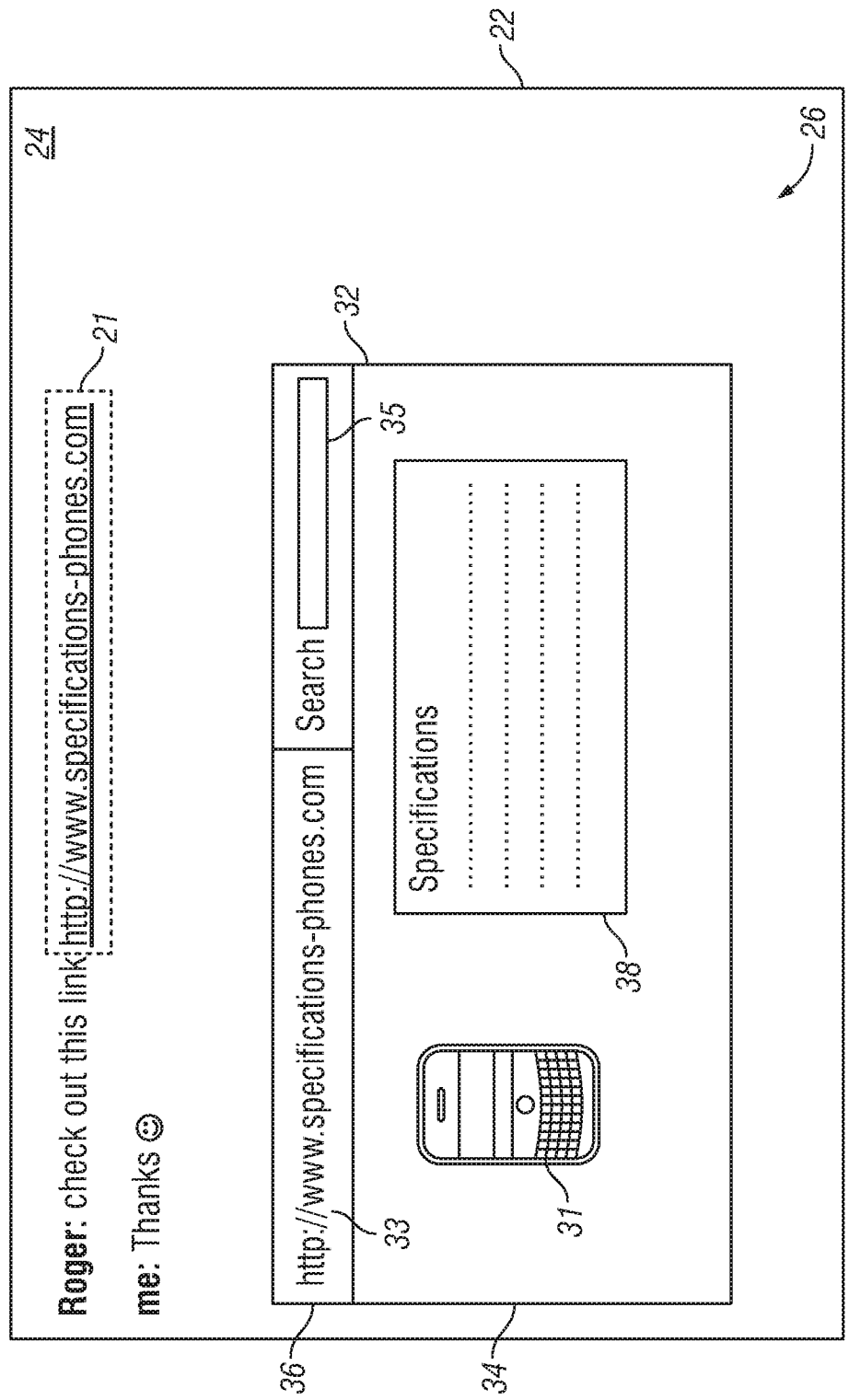
FIG. 3 is a screenshot showing a messaging window of the chat application interface shown in FIG. 2 according to the invention.

As can be seen from the above conversation, the chat application interface facilitates the exchange of textual content, such as requesting a suggestion for smartphones or a hyperlink, and/or graphical elements, such as thumbnail image. Upon receiving the hyperlink, John may click on the hyperlink to access the content that corresponds to the Web page associated with the hyperlink. Upon clicking on the hyperlink, a Web page that corresponds to the hyperlink opens in the messaging window, as opposed to opening in a separate Web browser, as shown in FIG. 3 below. This functionality is implemented, for example, by embedding a Web browser within the chat application.

FIG. 3 is a screenshot showing a messaging window 24 of the chat application interface 22 shown in FIG. 2 according to the invention. A shown in FIG. 2 discussed above, the messaging window 24 depicts an ongoing online conversation 26 between two users: John, referred to as "me" in the conversation, and Roger.

In FIG. 3, a latter portion of the conversation shown in FIG. 2 is included at the top of the messaging window to demonstrate continuity in the conversation. As discussed in connection with FIG. 2, after thanking Roger for providing the requested information, John clicks on the hyperlink 21. Upon clicking the hyperlink, a Web page 32 that corresponds to the hyperlink, i.e. http://www.specifications-phones.com, is opened in the messaging window, as opposed to being opened in a separate Web browser. In embodiments of the invention, the Web page 32 includes a page display section 34 and a menu section 36. The page display section includes textual content 38 and graphical content 31 that corresponds to the Web page. The menu section includes a link display section 33 that displays the hyperlink which corresponds to the Web page. The menu section also includes a search section 35 that enables the user to search on the page displayed on the page display section. The Web page and its components, such as the page display section and the menu section, are shown for purposes of example and the Web page may include fewer or more sections.

In embodiments of the invention, a chat application interface, such as the chat application interface 22, provides an option for selecting a type of content that the user wants to enter, and then provisions the type of content chosen by the user. For example, the chat application interface may include a menu option (not shown in FIG. 3) for providing textual and/or graphical content input. A selection of such a menu option allows a user to enter text messages or to provide graphical content In embodiments of the invention, in addition to the menu option that allows the user to provide textual and/or graphical content input, the chat application interface includes a menu option that facilitates Web browsing. In such a case, the textual content that corresponds to a Web uniform resource locator (URL)) that is added in an input bar that is associated with the chat application interface is treated as a URL/hyperlink, and a Web page is retrieved from the network and displayed on the messaging window. More specifically, if the user selects a Web browsing menu option, then the user is allowed to enter a URL and start browsing the Website in the messaging window itself.

In embodiments of the invention, the menu option that allows the user to provide textual and/or graphical content input may be selected by default, and the menu option for Web browsing is manually selected by user.

In alternate embodiments of the invention, the menu option for Web browsing is selected by default and the menu option that allows the user to provide textual and/or graphical content is manually selected by the user.

In embodiments of the invention, the chat application interface includes a menu option (not shown in FIG. 3) for selecting either a private mode and a co-browsing mode. In the private mode, the other chat participants cannot see the Web pages that are accessed in the messaging window by the user. However, in the co-browsing mode, the other chat participants are allowed to view the Web pages that are accessed by the user Alternatively, a user provides a URL as text to another chat participant, who then accesses the Website that is associated with the URL within his messaging window either a private or a co-browsing mode.

In embodiments of the invention, the user opts for co-browsing mode and shares the accessed Web page with one or more other users upon accessing a Web page in a private mode.

The chat participants use the same or similar type of messaging application that corresponds to the chat application interface for communication purposes. Moreover, the co-browsing mode may be facilitated using plug-ins, for example a script written using JavaScript, Dart, or any other scripting language, which records the changes in the messaging window and facilitates their transmittal via a Web server to other chat participant's messaging window.

In embodiments of the invention, the plug-ins are any of an in-built part of the messaging application, an external application that is externally loaded when the messaging application is loaded, a standalone application, and the like.

In embodiments of the invention, the user devices include different in-built plug-ins that effect recording, transmitting, storing, and executing of instructions. In embodiments of the invention, a required plug-in is activated by supplying an input to the messaging application. In other embodiments of the invention, a display of Web pages in another user's messaging window is facilitated through the co-browsing mode by converting one user's browser view into an image and displaying that image on the other user's chat application interface.

In embodiments of the invention, a user may drag and drop a URL into the messaging window and the Web page that corresponds to the URL is automatically converted into a Web page that is suitable for viewing in the messaging window. This may be implemented, for example, by fetching the Web page at the specified URL and rendering it through a Web browser embedded in the messaging application. Alternatively, such conversion is precluded if the Web page is pre-configured for the chat application interface. In embodiments of the invention, a Web page is transferred by a user from the chat application interface, i.e. from the messaging window into a Web browser, while retaining the original look and feel of the Web page.

In embodiments of the invention, the chat application interface allows the setting of a life of a message, graphics, or an opened Web page. More specifically, setting a life implies specifying a time period for which the message, graphics, and/or Web page is retained in a messaging window or storage, subsequent to which it is permanently deleted. In embodiments of the invention, the life of message, graphics, and/or Web page is lifelong (forever), a time period based, or an event-based span. For example, if a user performs an action such as purchasing an item, then by pressing a hide/delete key on the chat application interface the displayed message, graphics, and/or Web page is removed from the messaging window.

In embodiments of the invention, the chat application interface synchronizes user actions across a number of chat participants. For example, an action performed by a user, for example John, in the messaging window is replicated at messaging windows that correspond to one or more other chat participants. In embodiments of the invention, the order in which various operations are performed is maintained, depending upon a preset configuration, for example, entering a text message or graphical element, interaction with a Web page, etc. In embodiments of the invention, the chat application interface stores the conversations and/or browsing sequences and facilitates their retrieval at a later point of time. Further, stored content may be transferred to another chat participant and accessed at his chat application interface.

In embodiments of the invention, the chat application interface allows a user to freeze and/or unfreeze certain opened Web pages. If a Web page is frozen, then users are restricted from performing any action on the Web page. Upon unfreezing frozen Web pages, users can perform required operations. The freezing and/or unfreezing of Web pages is facilitated by any authorized user or by an automated system in conjunction with the chat application interface. In embodiments of the invention, the newly accessed Web pages in the chat application interface are opened below the previously opened Web pages in the messaging window, as shown in FIG. 4, discussed below.

Figure 4:
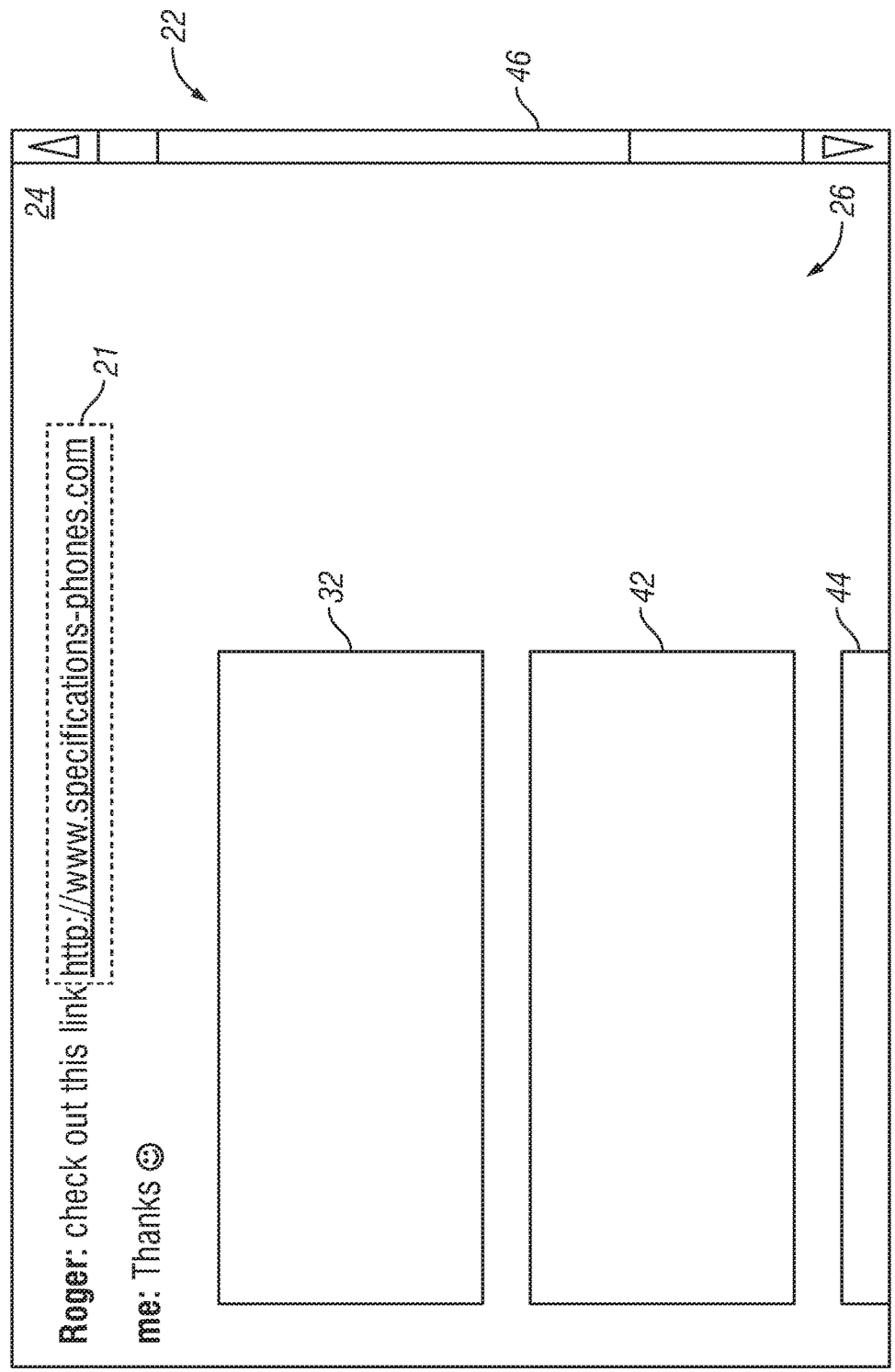
FIG. 4 is a screenshot showing the messaging window of the chat application interface shown in FIG. 2 according to the invention.

FIG. 4 is a screenshot showing the messaging window 24 of the chat application interface 22 shown in FIG. 2 according to the invention. As discussed in connection with FIGS. 2 and 3, the messaging window 24 depicts an ongoing online conversation 26 between two users: John, referred to as "me" in the conversation, and Roger.

In FIG. 4, a latter portion of the conversation depicted in FIG. 2 is included at the top of the messaging window to show continuity in the conversation. As discussed in connection with FIG. 2, after thanking Roger for providing requested information, John clicks on the hyperlink 21.

Upon clicking the hyperlink, a Web page 32 that corresponds to the hyperlink, i.e. http://www.specifications-phones.com, is opened in the messaging window, as opposed to being opened in a separate Web browser, as shown above in FIG. 3. Furthermore, John is able to access one or more Web pages subsequent to accessing the Web page. Thus, additional Web pages, such as Web page 42 and Web page 44, are opened in the messaging window below the previously accessed Web page.

As discussed above in connection with FIG. 3, John is able to select a menu option on the chat application interface for Web browsing, and can subsequently enter the textual content of a URL, such as URL corresponding to any of the Web pages 42 and 44, to access these Web pages in the chat application interface. Upon selection of the menu option for Web browsing, the textual content that is typed and/or posted in the input bar of the chat application interface is treated as a URL, and a Web page corresponding to the URL is retrieved and displayed on the messaging window.

As discussed above in connection with FIG. 3, the chat application interface includes a menu option for accessing Web pages in a private mode or a co-browsing mode. Accordingly, the Web pages 32, 42, and/or 44 are accessible in the private mode or the co-browsing mode.

A scroll bar 46 is provided in the messaging window to allow scrolling of the content that is displayed in the messaging window. Providing scroll-based access to Web pages eliminates the need for the user to switch tabs and/or Web pages, and also provides sequential, logical access to content. A scroll bar, such as the scroll bar 46, also facilitates scrolling in a horizontal direction. A scroll bar that facilitates horizontal scrolling can either replace the scroll bar 46 or it can be provided in addition to the scroll bar in the messaging window.

In embodiments of the invention, re-accessing a previously opened Web page causes the chat application interface to point to the location of the previously opened Web page. Alternatively, the chat application interface opens a previously opened Web page at a new location. In other embodiments of the invention, the previously opened Web page is moved to the end of a conversation and/or browsing. Various such configurations can be used to provide Web page access in a media application, such as the messaging application that corresponds to the chat application interface. The provision of Web page access in another media application, such as a standalone Web browser, is discussed below in connection with FIG. 5.

Figure 5:
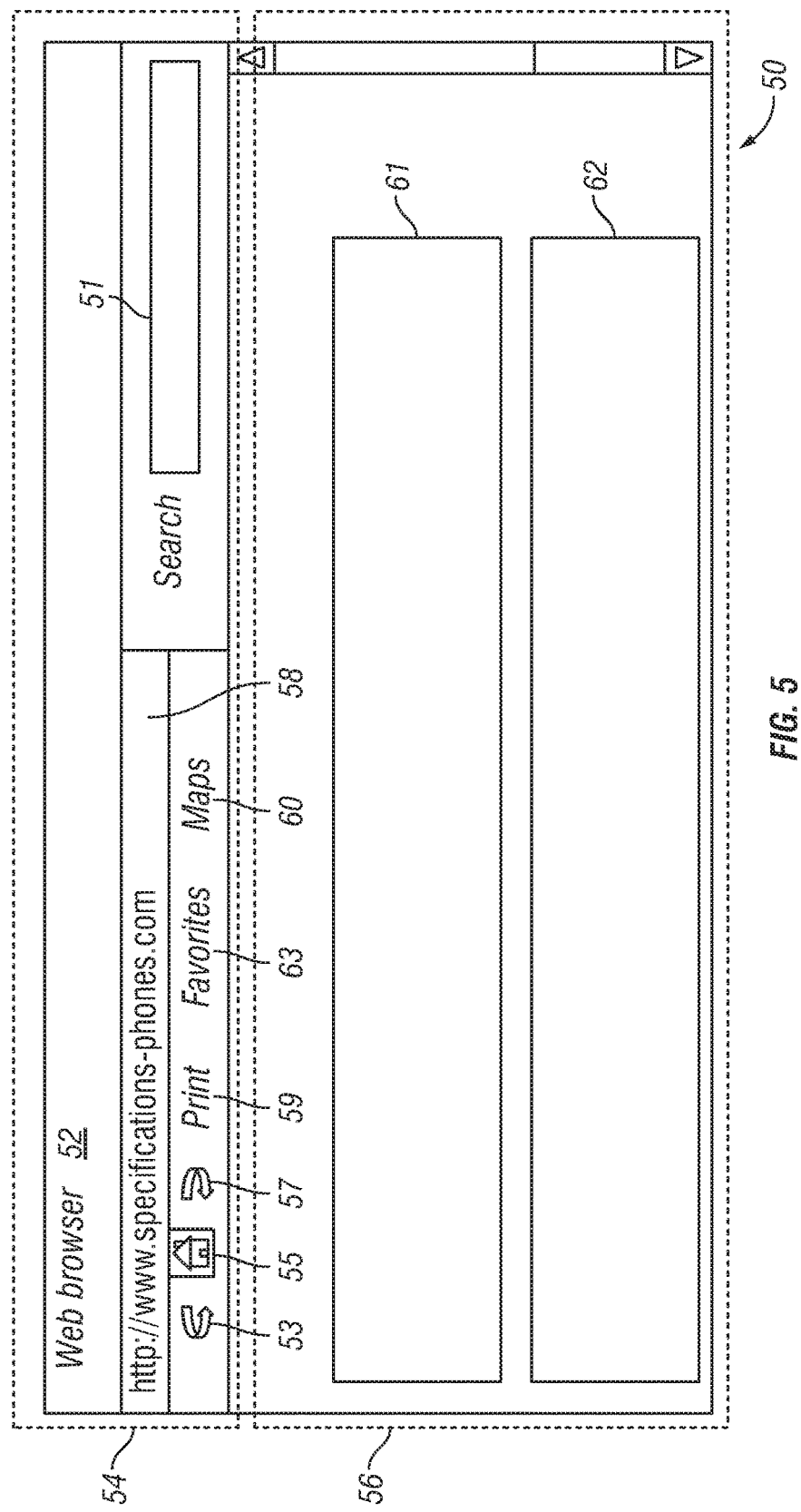
FIG. 5 is a screenshot showing a user device screen displaying a Web browser configured to facilitate Web page access according to the invention.

FIG. 5 is a screenshot showing a user device screen 50 displaying a Web browser 52 configured to facilitate Web page access according to the invention. The Web browser includes a menu section 54 and a Web page display section 56. The menu section includes one or more text entry bars, such as a first text entry bar 58 that allows a user to enter Web uniform resource locators (URLs), i.e. Website URLs; and a second text entry bar 51 that allows a user to perform a search via one or more search engines, such as Google®, Yahoo®, or any such known or proprietary Web search engine.

The first text entry bar displays a URL that corresponds to a presently displayed Web page from among the Web pages that are accessed by using the Web browser. Further, the menu section includes a plurality of icons, such as icons 53, 55, 57, 59, 60, and 63, that provide quick access to a previously accessed page, next accessed page, home page, print page feature, a favorite page feature and a map feature, respectively.

The Web page display section shows Web pages, such as Web page 61 and Web page 62, displayed one after the other within the same browser window. Various components of the Web browser are shown for purposes of example; the Web browser may include fewer or more components. In the Web browser, i.e. a Web browser that can provision Web pages one after the other, as opposed to facilitating Web page access in multiple tabs or multiple pages, a user accesses the content in a logical, sequential manner that precludes the need to switch back and forth between tabs and/or pages.

In embodiments of the invention, new Web pages are opened below the previously opened Web pages, or they are opened at a preconfigured location such as, for example, to the right of a previously opened Web page.

In embodiments of the invention, the Web browser points to the location of the previously opened Web page when a previously opened Web page is re-accessed. Alternatively, the Web browser opens a previously opened Web page at a new location. In embodiments of the invention, the previously opened Web page is moved to the end of a recently opened Web page. Also, a new copy or multiple copies of an already opened page are opened at a new location. Various such configurations provide Web page access in a media application, such as the Web browser.

Figure 6:
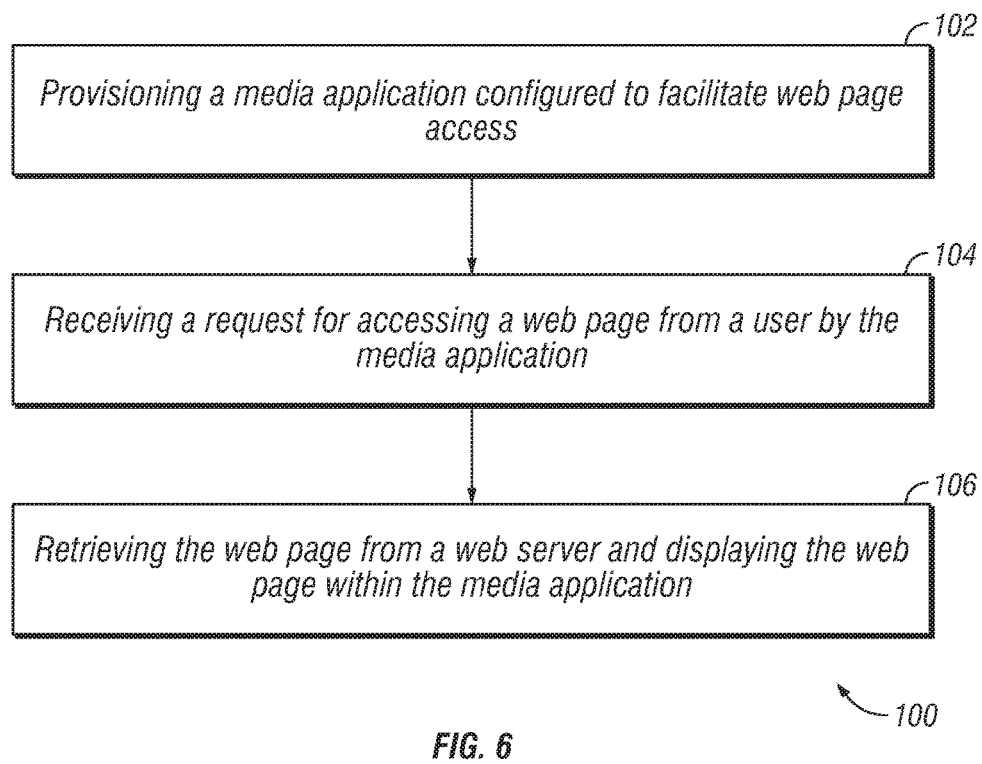
FIG. 6 is a flow diagram showing a method for facilitating Web page access in a media application according to the invention.

FIG. 6 is a flow diagram showing a method 100 for facilitating Web page access in a media application according to the invention. Embodiments of the invention are implemented, for example, by a messaging application that is associated with the chat application interface shown in FIG. 2, or by the Web browser shown in FIG. 5. However, the invention may be implemented by other systems than those explained with reference to FIGS. 2 to 5.

At step 102, a media application that facilitates Web page access is provisioned. At step 104, a request to access a Web page is provided by a user to the media application. At step 106, the Web page is retrieved from a Web server and displayed within the media application.

Embodiments of the invention facilitate Web page access in a plurality of media applications. Systems, such as a messaging application associated with the chat application interface or a Web browser allow a user access to Web pages within the media application, thereby permitting a logical, sequential, and configurable flow of communication; and thereby precluding the need for a user to switch back and forth between applications. In a messaging application, the sequential embedding of the browsed pages and typed messages provides the user with better context. The standalone browser disclosed herein opens new Web pages below previously opened Web pages, thereby allowing access to content in a meaningful manner. The page visit sequence and other actions, such as chat-message, etc., in one screen are captured in a correct, time-based order. The scroll-based information exchange also enhances the manner in which information is consumed.

Computer Implementation

Figure 7:
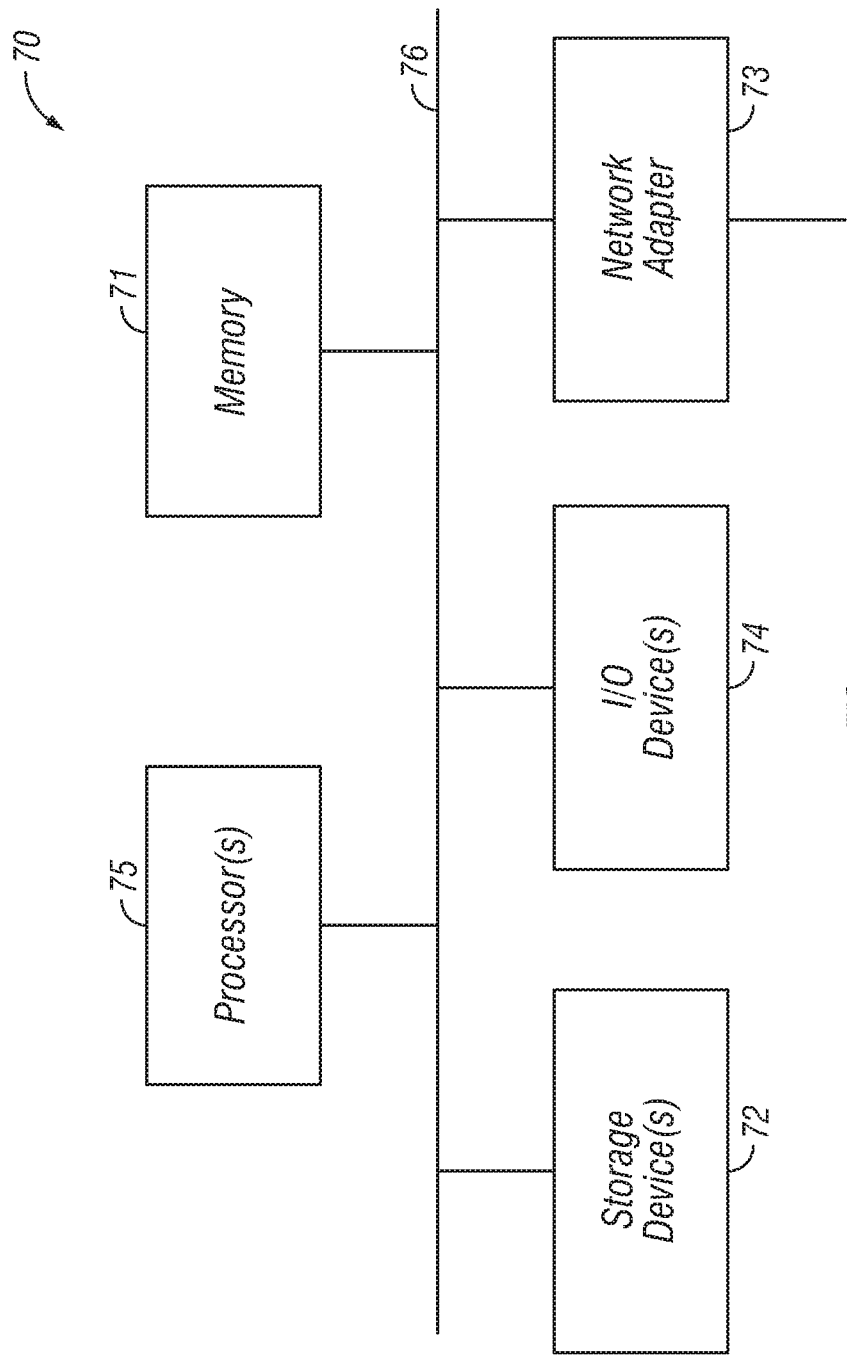
FIG. 7 is a block schematic diagram showing a machine in the example form of a computer system within which a set of instructions for causing the machine to perform one or more of the methodologies discussed herein may be executed.

FIG. 7 is a block diagram of a computer system that may be used to implement certain features of some of the embodiments of the invention. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a Web appliance, a network router, switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 70 may include one or more central processing units ("processors") 75, memory 71, input/output devices 74, e.g. keyboard and pointing devices, touch devices, display devices, storage devices 72, e.g. disk drives, and network adapters 73, e.g. network interfaces, that are connected to an interconnect 76.

In FIG. 7, the interconnect is illustrated as an abstraction that represents any one or more separate physical buses, point-to-point connections, or both connected by appropriate bridges, adapters, or controllers. The interconnect, therefore, may include, for example a system bus, a peripheral component interconnect (PCI) bus or PCI-Express bus, a Hyper-Transport or industry standard architecture (ISA) bus, a small computer system interface (SCSI) bus, a universal serial bus (USB), IIC (12C) bus, or an Institute of Electrical and Electronics Engineers (IEEE) standard 1394 bus, also referred to as FireWire.

The memory 71 and storage devices 72 are computer-readable storage media that may store instructions that implement at least portions of the various embodiments of the invention. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 71 can be implemented as software and/or firmware to program one or more processors to carry out the actions described above. In some embodiments of the invention, such software or firmware may be initially provided to the processing system 70 by downloading it from a remote system through the computing system, e.g. via the network adapter 73.

The various embodiments of the invention introduced herein can be implemented by, for example, programmable circuitry, e.g. one or more microprocessors, programmed with software and/or firmware, entirely in special-purpose hardwired, i.e. non-programmable, circuitry, or in a combination of such forms. Special-purpose hardwired circuitry may be in the form of, for example, one or more ASICs, PLDs, FPGAs, etc.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for Web page access, comprising:
   providing a processor executing instructions for provisioning a chat application to facilitate Web page access;
   said processor receiving a request for access to a Web page from a user via a hyperlink embedded in an ongoing online conversation displayed in a messaging window of a chat interface of the chat application through at least one of a plurality of channels;
   said processor retrieving contents of the requested Web page from a Web server in response to the request;
   said processor opening the Web page that corresponds to said embedded hyperlink and displaying the contents of the requested Web page embedded in the ongoing online conversation displayed in the messaging window of the chat interface of the chat application; and
   said processor enabling Web browsing within the ongoing online conversation displayed in the messaging window in each of (a) a private mode in which other chat participants cannot see Web pages that are accessed by the user and embedded in the ongoing online conversation displayed in the messaging window and h a co-browsing mode in which the other chat participants are allowed to view Web pages that are accessed by the user and embedded in the ongoing online conversation displayed in the messaging window.

2. The method of claim 1, further comprising:
facilitating, by the chat interface, the exchange of any of textual content and graphical elements.

3. The method of claim 1, further comprising:
providing, by the chat application, a Web page display section for displaying textual content and graphical content that corresponds to the Web page and a comprising a search section with which the user searches on the Web page displayed in a Web page display section; and
providing, by the chat application, a menu section comprising a link display section for displaying a hyperlink which corresponds to the Web page.

4. The method of claim 1, further comprising:
providing the chat interface for selecting a type of content selected by a user, wherein the chat application provisions the type of content selected by the user.

5. The method of claim 1, further comprising:
providing the chat interface for communicating any of textual and graphical content input with which a user performs at least one of entering text messages and providing graphical content.

6. The method of claim 1, further comprising:
providing the chat interface including a menu option for facilitating the Web browsing, in which textual content that corresponds to a Web uniform resource locator (URL) is added in an input bar that is associated with the chat interface and is treated as a URL/hyperlink, wherein the user enters a URL to start browsing a corresponding Website of the Web page in the messaging window.

7. The method of claim 1, further comprising:
providing the chat interface including a menu option with which a user provides any of textual and graphical content input by default and a menu option for Web browsing that is manually selected by the user.

8. The method of claim 1, further comprising:
providing the chat interface including a menu option for Web browsing by default and a menu option manually selected by the user with which a user provides any of textual and graphical content.

9. The method of claim 1, further comprising:
providing the chat interface having a menu option for selecting each of either the private mode and the co-browsing mode.

10. The method of claim 9, further comprising:
providing the chat interface in which a user provides a URL as text to another chat participant with which said another chat participant is able to access a Website that is associated with said URL within the messaging window in either of the private or the co-browsing mode.

11. The method of claim 9, further comprising:
said user opting for the co-browsing mode; and
said user sharing an accessed Web page with one or more of the other chat participants upon accessing a Web page in the private mode.

12. The method of claim 9, further comprising:
facilitating display of Web pages in a messaging window of another user's chat application in the co-browsing mode by converting one user's browser view into an image and displaying that image on another user's chat application interface.

13. The method of claim 1, further comprising:
providing a user device for operating the chat application;
providing for the user device one or more to include in-built plug-ins to effect recording, transmitting, storing, and executing of instructions.

14. The method of claim 13, further comprising:
activating a required plug-in by supplying an input to the chat application.

15. The method of claim 1, further comprising:
allowing a user to drag and drop a URL into a chat application messaging window of the chat application; and
automatically converting a Web page that corresponds to said URL into a Web page for display in said messaging window.

16. The method of claim 1, further comprising:
providing the chat interface for setting a life of any of a message, graphics, and an opened Web page, wherein setting a life specifies a time period for which said message, graphics, and/or Web page is retained in a messaging window or storage, subsequent to which said message, graphics, and/or Web page is permanently deleted.

17. The method of claim 1, further comprising:
providing the chat interface for synchronizing user actions across a number of chat participants.

18. The method of claim 1, further comprising:
retaining an order in which operations are performed by said processor, depending upon a preset configuration.

19. The method of claim 1, further comprising:
providing the chat interface for storing any of conversations and browsing sequences, and for facilitating retrieval thereof at a later point of time.

20. The method of claim 1, further comprising:
providing the chat interface with which a user freezes and/or unfreezes selected opened Web pages;
wherein if a Web page is frozen, users are restricted from performing any action on said Web page; and
wherein, upon unfreezing a frozen Web page, users are able to perform required operations.

21. The method of claim 1, further comprising:
opening newly accessed Web pages in the messaging window below previously opened Web pages.

22. The method of claim 1, further comprising:
providing a scroll bar in the messaging window for user scrolling of content that is displayed in said messaging window;
wherein scroll-based access to Web pages is provided to eliminate need for said user to switch tabs and/or Web pages, and to provide sequential, logical access to said content.

23. The method of claim 1, further comprising:
providing a scroll bar in the messaging window for scrolling in a horizontal direction.

24. The method of claim 1, further comprising:
causing the chat interface to point to a location of the previously opened Web page when re-accessing a previously opened Web page.

25. The method of claim 1, further comprising:
causing the chat interface to open a previously opened Web page at a new location.

26. The method of claim 1, further comprising:
moving a previously opened Web page to an end of any of a conversation and browsing within the messaging window.

27. The method of claim 1, further comprising:
said chat application providing a Web browser for facilitating Web page access;
said Web browser providing a menu section including one or more text entry bars that allow a user to enter Web uniform resource locators (URLs) that allow a user to perform a search via one or more search engines, wherein at least one text entry bar displays a URL that corresponds to a presently displayed Web page from among the Web pages that are accessed using said Web browser, and a Web page display section showing Web pages displayed one after the other within a same browser window.

28. The method of claim 27, further comprising:
opening new Web pages below previously opened Web pages or at a preconfigured location within the messaging window.

29. The method of claim 27, further comprising:
said Web browser pointing to a location of a previously opened Web page when a previously opened Web page is re-accessed within the messaging window.

30. The method of claim 27, further comprising:
said Web browser opening a previously opened Web page at a new location within the messaging window.

31. The method of claim 27, further comprising:
moving a previously opened Web page to an end of a recently opened Web page within the messaging window.

32. The method of claim 27, further comprising:
opening a new copy or multiple copies of an already opened page at a new location within the messaging window.

33. A computer implemented method for Web page access, comprising:
providing a processor executing instructions for provisioning a chat application to facilitate Web page access;
said processor receiving a request for access to a Web page from a user via a hyperlink embedded in an ongoing online conversation displayed in a messaging window of a chat interface of the chat application through at least one of a plurality of channels;
said processor retrieving contents of the requested Web page from a Web server in response to the request; and
said processor opening the Web page that corresponds to said embedded hyperlink to display the contents of the requested Web page embedded in the ongoing online conversation displayed in the messaging window and enable browsing of the embedded Web page within the chat application.

* * * * *